(12) United States Patent
Whitaker

(10) Patent No.: US 8,929,829 B2
(45) Date of Patent: Jan. 6, 2015

(54) IMPROVEMENTS RELATING TO DATA TRANSFER APPARATUS

(75) Inventor: Martin Whitaker, High Wycombe (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1797 days.

(21) Appl. No.: 11/629,293

(22) PCT Filed: Jun. 20, 2005

(86) PCT No.: PCT/GB2005/002425
§ 371 (c)(1),
(2), (4) Date: Nov. 9, 2007

(87) PCT Pub. No.: WO2005/124565
PCT Pub. Date: Dec. 29, 2005

(65) Prior Publication Data
US 2009/0197536 A1 Aug. 6, 2009

(30) Foreign Application Priority Data

Jun. 18, 2004 (GB) .................................. 0413700.6

(51) Int. Cl.
*H04B 1/00* (2006.01)
*G06F 13/28* (2006.01)
(52) U.S. Cl.
CPC ..................................... *G06F 13/28* (2013.01)
USPC .............. 455/65; 711/202; 711/217; 395/275
(58) Field of Classification Search
CPC ....................................................... G06F 13/28
USPC ....................... 455/65; 395/275; 711/202, 217
See application file for complete search history.

(56) References Cited

U.S. PATENT DOCUMENTS

| | | | |
|---|---|---|---|
| 4,658,247 A | | 4/1987 | Gharachorloo |
| 4,933,846 A | * | 6/1990 | Humphrey et al. ........... 710/107 |
| 5,068,849 A | | 11/1991 | Tanaka |
| 5,235,682 A | * | 8/1993 | Mitsuhira et al. ............... 710/60 |
| 5,734,926 A | | 3/1998 | Feeley et al. |
| 6,011,798 A | | 1/2000 | McAlpine |
| 6,026,443 A | | 2/2000 | Oskouy et al. |
| 6,029,225 A | | 2/2000 | McGehearty et al. |
| 6,052,375 A | | 4/2000 | Bass et al. |
| 6,070,194 A | | 5/2000 | Yu et al. |
| 6,275,877 B1 | | 8/2001 | Duda |
| 6,393,512 B1 | | 5/2002 | Chen et al. |
| 2002/0078270 A1 | | 6/2002 | Hofstee et al. |
| 2003/0095588 A1 | * | 5/2003 | Yellin et al. .................... 375/147 |
| 2003/0202567 A1 | * | 10/2003 | Yousef et al. ................. 375/148 |
| 2004/0030816 A1 | | 2/2004 | Knight et al. |
| 2004/0064670 A1 | * | 4/2004 | Lancaster et al. ............. 711/202 |
| 2004/0114672 A1 | * | 6/2004 | LaRosa et al. ................ 375/148 |

* cited by examiner

*Primary Examiner* — Hsin-Chun Liao

(57) ABSTRACT

A data movement controller (20) for controlling the movement between a shared data store (18) and a local data store (16) such that the data can be used by a plurality of parallel data processing elements is described. The data movement controller (20) comprises a set of data registers (56, 58, 60) which, in use, are loaded with different data parameters (57, 61, 62) to define a plurality of different ways in which data is transferred between the shared data store (18) and a set of processing elements (12). The data parameters (57, 61, 62) define a set of time delays for transferring portions of the data to predefined ones of the plurality of processing elements (12) and the type of overall data transfer that is to be carried out. The transfer of data in this programmable manner facilitates efficient use of the data movement controller (20) with SIMD associate processors (12) and in one example, the efficient processing of a stream of multiple-source digital data received at radio telecommunications base station to remove distortion due to multi-path effects.

25 Claims, 13 Drawing Sheets

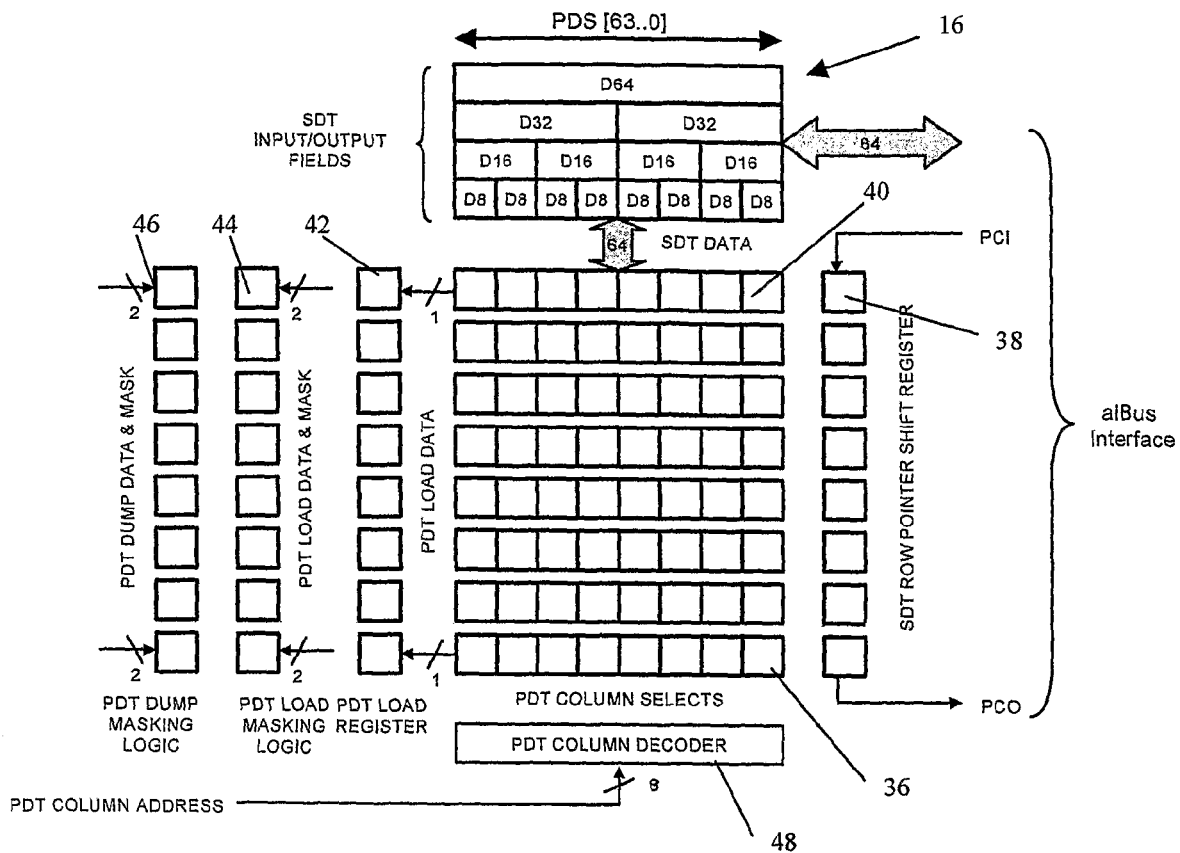
Fig 2 PDS Organisation

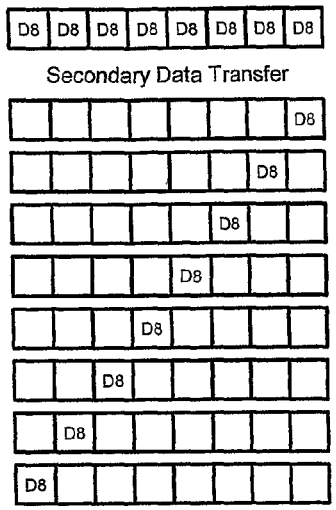
(a)
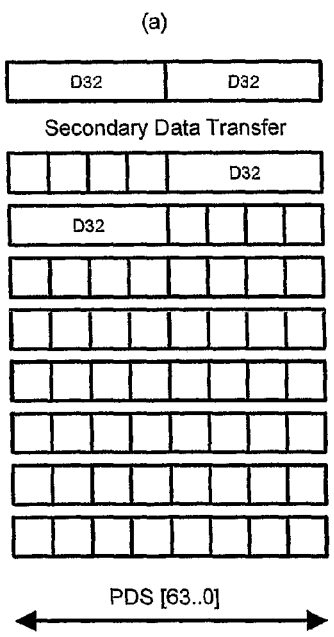
(c)
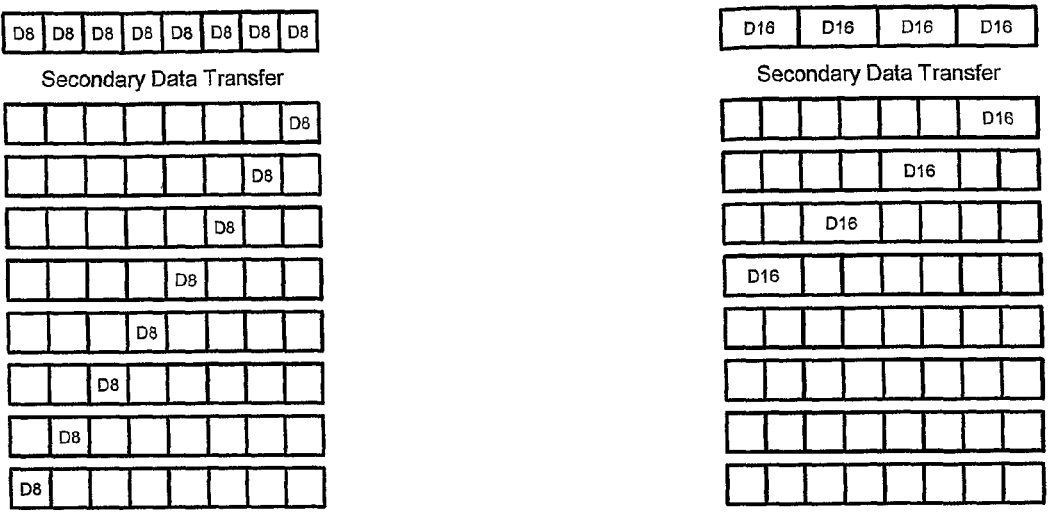
(b)
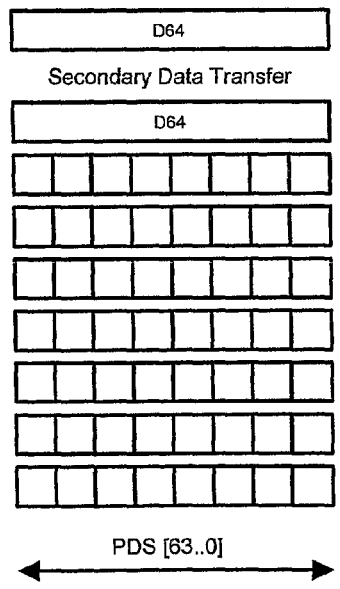
(d)
Figs 3(a) – 3(d) ALbus Secondary Transfer Modes

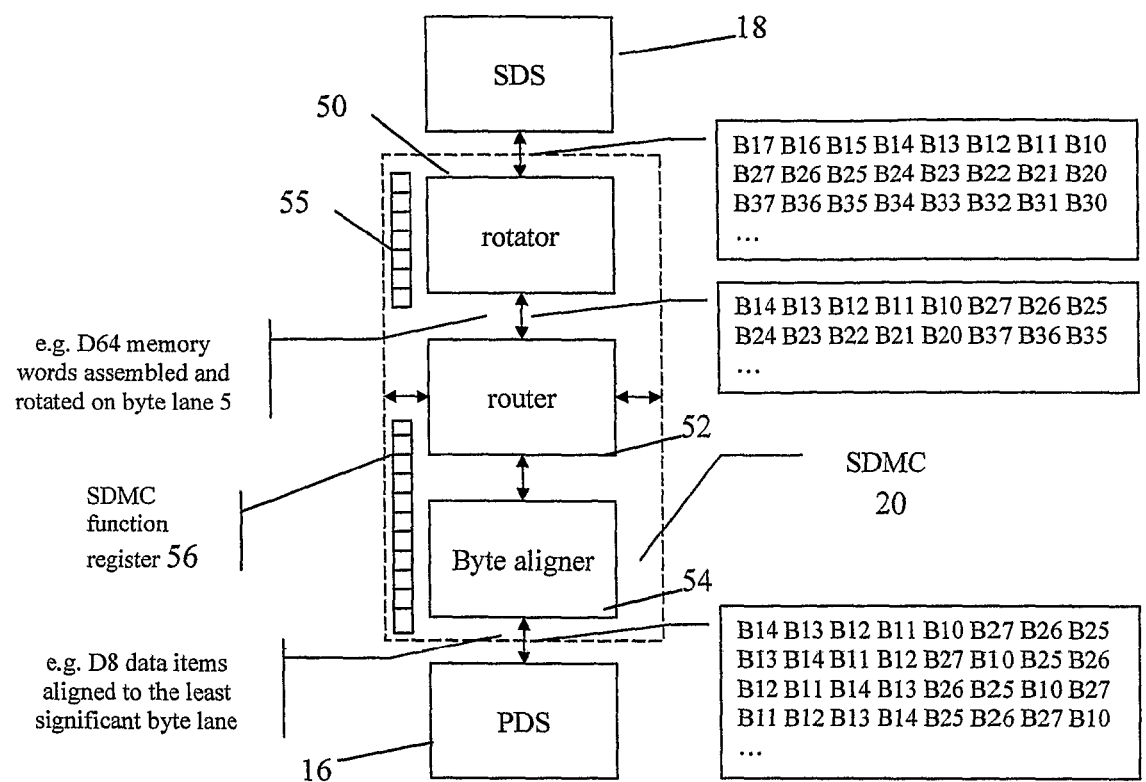
Fig 4 SDS-PDS memory pathway

DataSize=D8

| SDSaddress[2:0] | Data Routing | | | | | | | |
|---|---|---|---|---|---|---|---|---|
| 0 | Byte 7 | Byte 6 | Byte 5 | Byte 4 | Byte 3 | Byte 2 | Byte 1 | Byte 0 |
| 1 | Byte 6 | Byte 7 | Byte 4 | Byte 5 | Byte 2 | Byte 3 | Byte 0 | Byte 1 |
| 2 | Byte 5 | Byte 4 | Byte 7 | Byte 6 | Byte 1 | Byte 0 | Byte 3 | Byte 2 |
| 3 | Byte 4 | Byte 5 | Byte 6 | Byte 7 | Byte 0 | Byte 1 | Byte 2 | Byte 3 |
| 4 | Byte 3 | Byte 2 | Byte 1 | Byte 0 | Byte 7 | Byte 6 | Byte 5 | Byte 4 |
| 5 | Byte 2 | Byte 3 | Byte 0 | Byte 1 | Byte 6 | Byte 7 | Byte 4 | Byte 5 |
| 6 | Byte 1 | Byte 0 | Byte 3 | Byte 2 | Byte 5 | Byte 4 | Byte 7 | Byte 6 |
| 7 | Byte 0 | Byte 1 | Byte 2 | Byte 3 | Byte 4 | Byte 5 | Byte 6 | Byte 7 |

DataSize=D16

| Byte lane select | Data Routing | | | | | | | |
|---|---|---|---|---|---|---|---|---|
| 0 | Byte 7 | Byte 6 | Byte 5 | Byte 4 | Byte 3 | Byte 2 | Byte 1 | Byte 0 |
| 2 | Byte 5 | Byte 4 | Byte 7 | Byte 6 | Byte 1 | Byte 0 | Byte 3 | Byte 2 |
| 4 | Byte 3 | Byte 2 | Byte 1 | Byte 0 | Byte 7 | Byte 6 | Byte 5 | Byte 4 |
| 6 | Byte 1 | Byte 0 | Byte 3 | Byte 2 | Byte 5 | Byte 4 | Byte 7 | Byte 6 |

DataSize=D32

| Byte lane select | Data Routing | | | | | | | |
|---|---|---|---|---|---|---|---|---|
| 0 | Byte 7 | Byte 6 | Byte 5 | Byte 4 | Byte 3 | Byte 2 | Byte 1 | Byte 0 |
| 4 | Byte 3 | Byte 2 | Byte 1 | Byte 0 | Byte 7 | Byte 6 | Byte 5 | Byte 4 |

DataSize=D64

| Byte lane select | Data Routing | | | | | | | |
|---|---|---|---|---|---|---|---|---|
| 0 | Byte 7 | Byte 6 | Byte 5 | Byte 4 | Byte 3 | Byte 2 | Byte 1 | Byte 0 |

Fig. 5

| Name | Size | Description |
|---|---|---|
| SkewOffset1 | 16 | Skew value for PDS block 1. Defaults to 0H. |
| SkewOffset2 | 16 | Skew value for PDS block 2. Defaults to 0H. |
| SkewOffset3 | 16 | Skew value for PDS block 3. Defaults to 0H. |
| SkewOffset4 | 16 | Skew value for PDS block 4. Defaults to 0H. |
| SkewOffset5 | 16 | Skew value for PDS block 5. Defaults to 0H. |
| SkewOffset6 | 16 | Skew value for PDS block 6. Defaults to 0H. |
| SkewOffset7 | 16 | Skew value for PDS block 7. Defaults to 0H. |
| SkewOffset8 | 16 | Skew value for PDS block 8. Defaults to 0H. |
| SkewOffset9 | 16 | Skew value for PDS block 9. Defaults to 0H. |
| SkewOffset10 | 16 | Skew value for PDS block 10. Defaults to 0H. |
| SkewOffset11 | 16 | Skew value for PDS block 11. Defaults to 0H. |
| SkewOffset12 | 16 | Skew value for PDS block 12. Defaults to 0H. |
| SkewOffset13 | 16 | Skew value for PDS block 13 Defaults to 0H. |
| SkewOffset14 | 16 | Skew value for PDS block 14. Defaults to 0H. |
| SkewOffset15 | 16 | Skew value for PDS block 15. Defaults to 0H. |
| SkewOffset16 | 16 | Skew value for PDS block 16. Defaults to 0H. |
| SkewStep1 | 16 | Value by which the skew value is decremented |
| SkewStep2 | 16 | Value by which the skew value is incremented. |

Fig. 6 – Configuration Registers

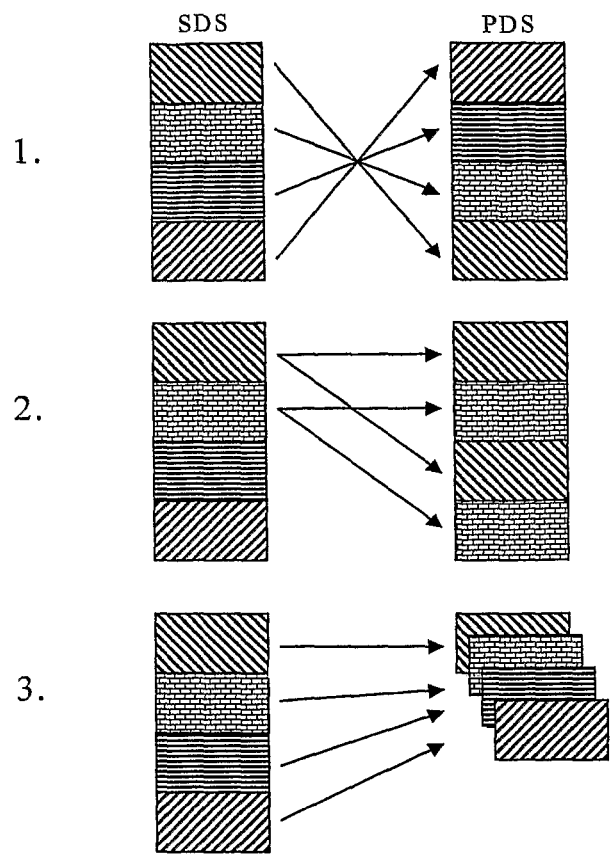
Fig 7 - Block Mode Offset Transfers – general concept

| Register | Register Value |
|---|---|
| SkewOffset1 | 0000H |
| SkewOffset2 | 0800H |
| SkewOffset3 | 1000H |
| SkewOffset4 | 1800H |
| SkewOffset5 | 2000H |
| SkewOffset6 | 2800H |
| SkewOffset7 | 3000H |
| SkewOffset8 | 3800H |
| SkewOffset9 | 4000H |
| SkewOffset10 | 4800H |
| SkewOffset11 | 5000H |
| SkewOffset12 | 5800H |
| SkewOffset13 | 6000H |
| SkewOffset14 | 6800H |
| SkewOffset15 | 7000H |
| SkewOffset16 | 7800H |
| SkewStep1 | 8H. |
| SkewStep2 | 0H. |

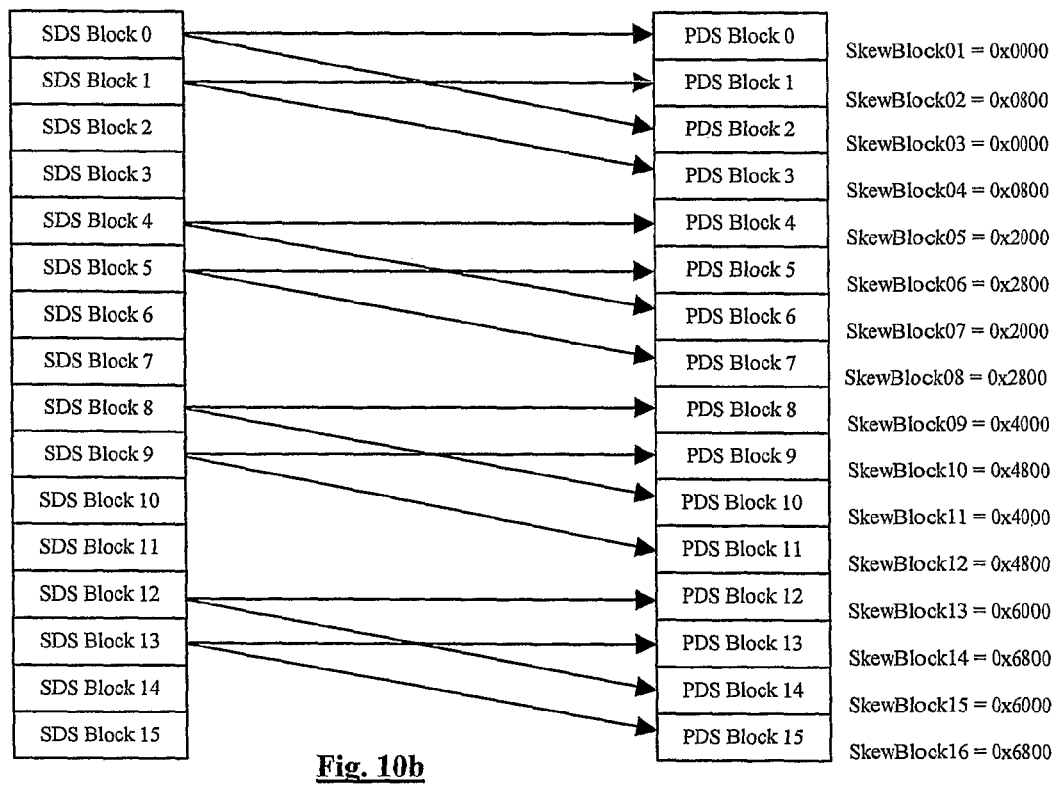
Fig. 10a
Fig. 10b

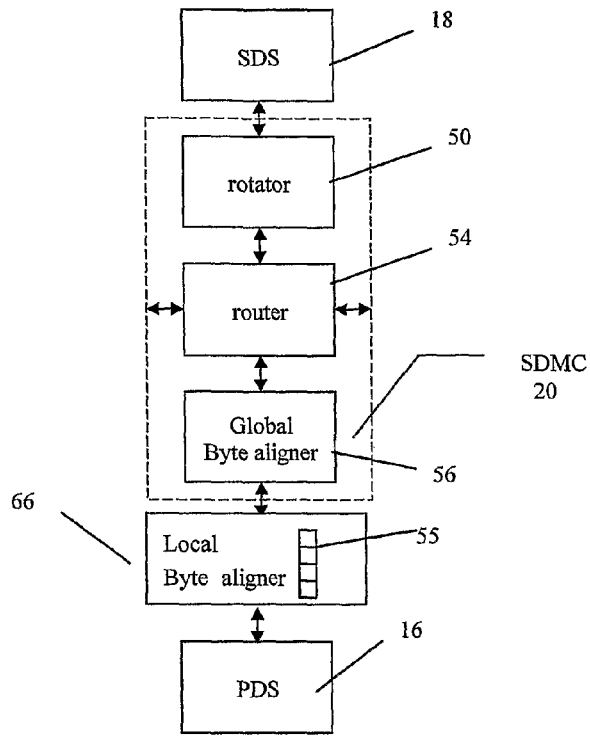

Fig. 11 - Local and Global byte alignment function

| Register | Value | |
|---|---|---|
| SkewOffset | Offset (in bytes) to the first sample in SDS that is required to be stored into the PDS | |
| SkewStep1 | Size (in bytes) of the item retrieved from memory by the SDMC | |
| | DataSize=D64 | SkewStep1=8 |
| | DataSize=D32 | SkewStep1=4 |
| | DataSize=D16 | SkewStep1=2 |
| | DataSize=D8 | SkewStep1=1 |
| SkewStep2 | Offset between successive samples (in bytes) – SkewStep1 | |

Fig. 12

Table  Local Byte Lane Swap Protocol

| Local SkewCount[2:0] | Data[63:0] | | | | | | |
|---|---|---|---|---|---|---|---|
| 0 | Byte 7 | Byte 6 | Byte 5 | Byte 4 | Byte 3 | Byte 2 | Byte 1 | Byte 0 |
| 1 | Byte 6 | Byte 7 | Byte 4 | Byte 5 | Byte 2 | Byte 3 | Byte 0 | Byte 1 |
| 2 | Byte 5 | Byte 4 | Byte 7 | Byte 6 | Byte 1 | Byte 0 | Byte 3 | Byte 2 |
| 3 | Byte 4 | Byte 5 | Byte 6 | Byte 7 | Byte 0 | Byte 1 | Byte 2 | Byte 3 |
| 4 | Byte 3 | Byte 2 | Byte 1 | Byte 0 | Byte 7 | Byte 6 | Byte 5 | Byte 4 |
| 5 | Byte 2 | Byte 3 | Byte 0 | Byte 1 | Byte 6 | Byte 7 | Byte 4 | Byte 5 |
| 6 | Byte 1 | Byte 0 | Byte 3 | Byte 2 | Byte 5 | Byte 4 | Byte 7 | Byte 6 |
| 7 | Byte 0 | Byte 1 | Byte 2 | Byte 3 | Byte 4 | Byte 5 | Byte 6 | Byte 7 |

Where Byte0 is bits 7:0 of the original data in.

Fig. 13

| SkewCount | SkewCount' | Comment |
|---|---|---|
| 0 | 8 | SkewCount<DataSize, therefore write item SkewCount<SkewStep1 therefore increment SkewCount by SkewStep2 |
| 8 | 0 | SkewCount=DataSize, therefore do not write item. SkewCount=SkewStep1 therefore decrement SkewCount by SkewStep1 |
| Repeat above sequence | | |

Fig. 15

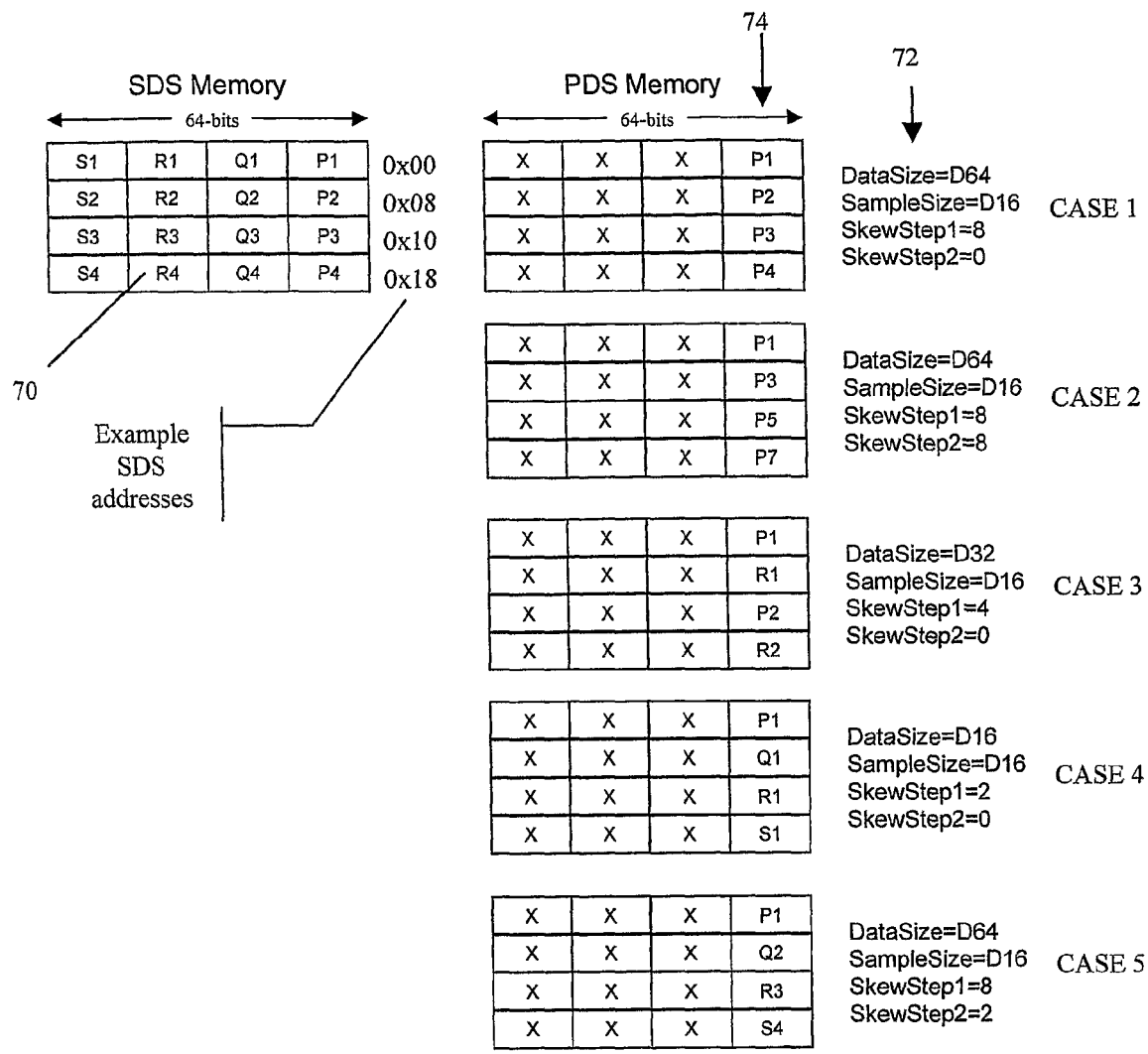
Fig 14 - Block Transfer Sub-sampling Examples

IMPROVEMENTS RELATING TO DATA TRANSFER APPARATUS

FIELD OF THE INVENTION

The present invention concerns improvements relating to data transfer apparatus and more particularly, though not exclusively, to a method of and apparatus for efficiently processing a stream of multiple-source digital data received at radio telecommunications base station, such as a mobile telecommunications base station, to remove distortion due to multi-path effects.

BACKGROUND OF THE INVENTION

In communications, especially base-stations for mobile telecommunications there is a requirement to retrieve the original signal from the receiver channel. The received signal is often subject to strong distortion due to multi-path effects i.e. signal reflections caused by interference in built-up urban areas, for example. Each multi-path is often known as a finger.

Extracting data for each individual finger from the composite received signal is possible with knowledge of the associated phase delay. More specifically, the required data for each finger is a subset of the received data stream (which in turn is sub-sampled) with a different phase delay according to the different expected round trip delay of that particular multi-path between the sender and the receiver. These sub-sampled data sets need to be coherently summed by a subsequent processing phase to maximise the S/N (Signal to Noise) ratio of the received signal.

Determining knowledge of these phase delays and thereafter using these to extract the relevant information regarding each finger is a non-trivial task. Nevertheless techniques are known for performing this processing. For example, the different phase delays can be determined by an earlier matched filter step (correlation) against a known sequence in each frame—which obtains the energy peaks—which in turn correspond to the strong multi-paths. This data provides the information required in order to control the subsequent received data processing.

In order to be able to perform the various different types of processing techniques required on the received data to improve the S/N ratio, powerful computers are required. However, due to the time constraints of wishing to perform this processing in real time as the data is being received, namely on-the-fly, the S/N ratio of the processed signal is low, which turn leads to a relatively low-quality received signal.

SUMMARY OF THE INVENTION

It is desired to improve the quality of the received signal in the above-described situation. More particularly, it is desired to provide a data transfer technique and apparatus which make the processing faster whilst still retaining the flexibility to carry out all of the different types of processing required to resolve the multi-path distortion in an efficient manner such that real-time processing can be carried out as a data stream is being received.

The present invention resides in the appreciation that there is a data processing bottleneck created by the requirement for carrying out flexible data processing, namely carrying out several different modes of data transfer (e.g. loading) from a single data stream 'on-the-fly'. The bottleneck concerns the multiple data fetches required by the processing elements for switching between the different transfer modes in carrying out the required data transfers within the short time period available. The solution to this bottleneck, is to provide a programmable data movement controller which is flexible enough to carry out the desired multiple modes of data transfer with the minimum of reprogramming of the data controller, as data fetches are a costly overhead when transferring data 'on-the-fly'.

More specifically, according to one aspect of the present invention there is provided a data movement controller for controlling the movement between a shared data store and a data local store such that the data can be used by a plurality of parallel data processing elements, the data movement controller comprising a set of data registers which, in use, are loaded with different data parameters to define a plurality of different data transfers between the shared data store and a set of processing elements associated with the local data store; the data parameters defining a set of time delays for transferring portions of the data to predefined areas of the local memory for use with a predetermined processing elements and the type of data transfer that is to be carried out.

The ability to program the way in which different processing tasks and delays will be carried out in effecting the data transfer, means that the need for separate data accesses required to perform further tasks can be minimised. This in turn leads to a far more efficient system as the data bottleneck has been resolved. Also the ability to carry out more than one type of data transfer assists a programmer in being able to use the improved efficiency in different conditions and contexts. In this regard, one of the most efficient types of data transfer is made possible by the present invention, namely intercepting the data stream and carrying out multi-dropping of data. Multi-dropping of data is effected when the same block of data is copied to more than one data block without requiring a further data fetch operation.

The plurality of data registers are preferably programmable, and each can be loaded with an offset value for specifying an individual time delay in effecting a data transfer between the shared data store and the local data store.

The data movement controller preferably also comprises a plurality of data counters which, in use, are loaded with the offset values programmed into the data registers and subsequently decremented to a predetermined value to effect corresponding delays.

The provision of a plurality of programmable data registers which act to load corresponding counters in the data movement controller means that the data transfer can be controlled completely by virtue of programming the data movement controller. This advantageously means that the solution is completely modular not requiring any changes to the local data store for example. Also decrementing of the counters with each data sample transfer provides a relatively simple way of implementing this aspect of the present invention.

The invention achieves efficiencies by enabling a stream of received data to be broadcast to a plurality of processors in a block. Such block data transfers under the control of the data movement controller do speed up the data transfer providing improved data processing efficiencies.

The controller may further comprise executing means for executing an algorithm for determining the type of overall data transfer that is to be carried out. The algorithm provides simple rules for using the specified parameters to effect the data transfer efficiently. Knowledge of the algorithm advantageously enables a programmer to utilise the efficiencies possible with the present invention in many different conditions through software.

The controller is preferably arranged to implement a plurality of types of data transfer selected from the group comprising: a simple sequential block mode transfer, a block reordering block mode transfer, a multi-cast block mode transfer and an overlapping block mode transfer. This provides a wide variety ways in which a constant data stream can be used by a plurality of processing elements without the need for requesting the data again.

The controller can also be arranged, by virtue of the register values alone, to implement a sub-sampled block mode transfer. This enables data loading to occur which would normally require more programming and more memory data fetches in a parallel programming environment.

The controller may further comprise a data byte aligner arranged to align bytes to be transferred into byte lanes and then to swap bytes between byte lines to change their sequential ordering. This also provides further flexibility in the data transfer and enables the data to be used by a local store such as that described in our co-pending International Patent Application number PCT/GB2005/000895.

The data byte aligner may be arranged to align the data bytes on any specified byte boundary and to do this according to the sample size specified in the data size registers. This facilitates easier and faster transfer of data to the local memory.

The byte aligner may comprise a global byte aligner arranged to align bytes according to global parameters relating to the data transfer and the shared data store and a local byte aligner arranged to align bytes according to local parameters relating to the local data store. This provides a further level of flexibility in controlling the data transfer.

The controller may further comprise a byte rotator for rotating the sequence of data bytes to be transferred to the local data store, the byte rotator being arranged to rotate the data bytes to any data byte boundary specified. Again the data transfer can be manipulated to provide the data in the correct format for the particular way in which the data is to be processed. This is particularly advantageous when complex data is being processed as is the case in the application described in the introduction.

The present invention is arranged to:
1. allow a stream of data to be broadcast to multiple APE blocks and to allow each block to start storing the data at a different point in the data stream in contiguous, permuted or overlapping sections.
2. Allow each APE block to sub-sample portions of the data stream Thereby to
3. Minimise the number of times the SDMC DMA must be reprogrammed.

In order to achieve some of the functionality demonstrated here, in the prior art an SDMC would have to be reprogrammed at each block boundary, adding considerably to the control overhead. The present invention allows the SDMC to be programmed once—albeit with more parameters—and the processing blocks now collect data from the data stream 'on-the-fly'. Moreover, the present invention enables multi-dropping of data without the need to access the same data repeated from SDS—thereby lowering the SDS bandwidth requirements.

The present invention extends to an apparatus for efficiently processing a stream of multiple-source digital data received at radio telecommunications base station to remove distortion due to multi-path effects, the apparatus comprising using a data controller as defined above to transfer data from a shared memory to a local memory for processing.

According to another aspect of the present invention there is provided a method of controlling the movement of data between a shared data store and a data local store such that the data can be used by a plurality of parallel data processing elements, the method comprising: loading a set of data registers with different data parameters to define a plurality of different data transfers between the shared data store and a set of processing elements associated with the local data store; the data parameters defining a set of time delays for transferring portions of the data to predefined areas of the local memory for use with a predetermined processing elements and the type of data transfer that is to be carried out; and executing the desired transfer based on the stored parameters.

The present aspect of the present invention extends to a method of efficiently processing a stream of multiple-source digital data received at radio telecommunications base station to remove distortion due to multi-path effects, the method comprising a method of transferring data from a shared memory to a local memory for processing as described above.

According to a further aspect of the present invention there is provided a method of processing a distorted radio telecommunications signal transmitted by a source and received at a base station, the method comprising: determining a plurality of phase delay times relating to multiple transmission paths between the source and base station; calculating a plurality of skew offset parameters from the corresponding phase delay times, the values of the plurality of skew offset parameters specifying the manner in which data is to be transferred to each of the blocks of processors, including the timing of each transfer; storing the received distorted radio communications signal as bytes of digital data in a shared data store, using the skew offset parameters to control the manner by which the bytes of digital data are transferred between the shared data store and a local data store for a plurality of blocks of parallel processors.

BRIEF DESCRIPTION OF THE DRAWINGS

The invention will be described, by way example only, with reference to the accompanying drawings, in which:

FIG. 2 is a schematic block diagram showing in further detail components of the PDS of FIG. 1;

FIGS. 3a to 3d are schematic block diagrams illustrating the corner-turning function implemented by the multi-ported orthogonal memory of FIG. 2 when carrying out a secondary data transfer for different data modes;

FIG. 4 is a schematic block diagram showing an SDMC according to a first embodiment of the present invention together with examples of the functionality of the components of the SDMC;

FIG. 5 is a series of tables showing byte lane alignment function for different data sizes of a byte aligner shown in FIG. 4;

FIG. 6 is a schematic block diagram showing the configuration of data registers with in the SDMC shown in FIG. 4;

FIG. 7 is a schematic diagram showing the different types of data transfers which are possible using the present embodiment of the present invention;

FIG. 8a is a table showing the values of the different registers of the SDMC of FIG. 4, for illustrating a Simple Sequential Block Mode Transfer;

FIG. 8b is a schematic block diagram showing the data transfer caused by the data values stored in the data registers as shown in FIG. 8a;

FIG. 9a is a table showing the values of the different registers of the SDMC of FIG. 4, for illustrating a Block Reordering Block Mode Transfer;

FIG. 9b is a schematic block diagram showing the data transfer caused by the data values stored in the data registers as shown in FIG. 9a;

FIG. 10a is a table showing the values of the different registers of the SDMC of FIG. 4, for illustrating a Multi-cast Block Mode Transfer;

FIG. 10b is a schematic block diagram showing the data transfer caused by the data values stored in the data registers as shown in FIG. 10a;

FIG. 11 is a schematic block diagram showing an SDMC according to an second embodiment of the present invention;

FIG. 12 is a table showing the functionality of the different data registers of the SDMC;

FIG. 13 is a table showing the function of a local byte aligner of the second embodiment shown in FIG. 11;

FIG. 14 is a set of examples showing how data sub-sampling can be implemented by use of different values in the SDMC of either the first or second embodiments; and FIG. 15 is a table itemising the behaviour of an algorithm in the CASE 2 example of FIG. 14 and showing how parameters stored in the data registers are used to effect sub-sampling of the data without the need for further data fetch operations.

DETAILED DESCRIPTION OF THE PRESENTLY PREFERRED EMBODIMENTS

The present embodiment is a directed to an improved SDMC (Secondary Data Movement Controller), which is used in conjunction with a known Aspex SIMD (Single Instruction Multiple Data) parallel processor to achieve the appropriate processing of a received distorted signal. The Aspex parallel processor is based on the use of Associative Processing Elements (APEs) as has been described in co-pending international patent application number PCT/GB2005/000895, which has been disclosed to the public. More specifically, the processor comprises 4096 APEs per chip with 256 APEs per block. It has an hierarchical memory structure with three elements:

1. TDS Tertiary Data Store
   Main memory storage. Data is moved to/from the SDS via a DMA
2. SDS Secondary Data Store
   Intermediate storage. Data is moved to and from the PDS by a specialised DMA called the Secondary Data Movement Controller (SDMC).
3. PDS Primary Data Store
   Local storage, one level above the APE data registers.

Figure 1:
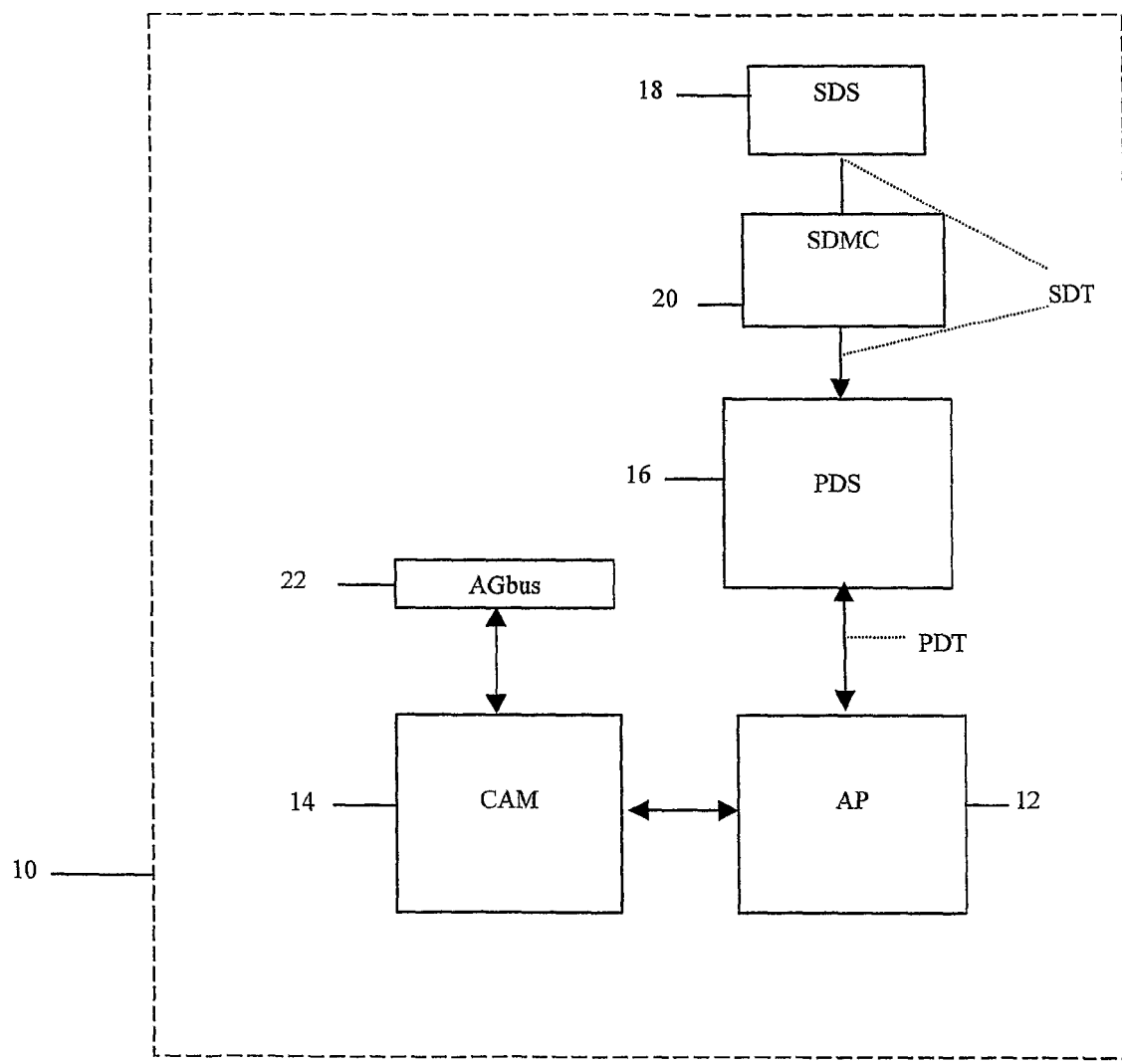
FIG. 1 is a schematic block diagram showing a SIMD (Single Instruction Multiple Data) processing architecture including a Secondary Data Movement Controller (SDMC) for performing secondary data transfers from a Secondary Data Store (SDS) to a Primary Data Store (PDS) according to an embodiment of the present invention.

Referring now to FIG. 1, there is shown an apparatus 10 for implementing presently preferred embodiments of the present invention. The apparatus 10 comprises an Associative Processor array 12, which interfaces with a Content Addressable Memory 14 and a Primary Data Store (PDS) 16.

The Associative Processor array 12 is a programmable, homogeneous and fault-tolerant SIMD parallel processor incorporating a string of identical processing units (APEs), a software-programmable intercommunication network, and a vector data buffer for fully-overlapped data I/O (not shown). At the physical level, the Associative Processor 12 is implemented as a bit-serial, word-parallel associative parallel processor in that all the APEs can simultaneously perform the same arithmetic, logical or relational operation in a bit-serial manner. As the architecture of the Associative Processor 12 has been disclosed and is known to the skilled addressee, it is not described further herein.

The Content Addressable Memory 14 is in the form of an array which typically comprises 128 word rows, with each word being 64 bits wide. The Content Addressable Memory 14 may be considered to be the working registers of the Associative Processor array 12.

The PDS 16 is an orthogonal-type memory which may be considered to be the local input-output data store of the Associative Processor 12. The PDS 16 interfaces with a Secondary Data Store (SDS) 18, such as RAM or other conventional memory sub-system, via a local ALbus (note shown) under the control of a SDMC (Secondary Data Movement Controller) 20. The Content Addressable Memory 14 receives or returns data via the AGbus 22. Instructions received by the SDMC 20 cause it to implement software programmable operations directed to the transfer of data between the SDS 18 and the PDS 16 (as is described in greater detail later).

Data is transferred between the SDS 18 and the PDS 16 under the control of the SDMC 20 in a bit-parallel word-serial manner, and this type of data transfer is referred to hereinafter as Secondary Data Transfer (SDT). Data is transferred between the PDS 16 and the Associative Processor 12 in a bit-serial word-parallel manner, and this type of data transfer is referred to hereinafter as Primary Data Transfer (PDT). Both Primary and Secondary Data Transfers permit the transfer of data in four different modes: D8, D16, D32 and D64, where the D8 mode is the transfer of eight 8-bit data items, the D16 mode is the transfer of four 16-bit data items, the D32 mode is the transfer of two 32-bit data items, and the D64 mode is the transfer of one 64-bit data item.

The internal structure of the PDS 16 is shown in FIG. 2 and is described below. Its operation as a memory carrying out a corner turning function is described in the above co-pending International Patent Application, FIG. 3 and in the accompanying Appendix.

The PDS 16 comprises a plurality of data memory cells 36 arranged in the form of a memory matrix having a plurality of rows and columns. In this example, the memory matrix comprises eight rows and eight columns, each row comprising a 64-bit data register 40. Thus, each data memory cell 36 comprises eight memory bit cells 50 (described later). The PDS 16 also includes an 8-bit SDT row pointer shift register 38 for determining a word row location in the memory matrix for a data item being transferred, each bit of the shift register 38 being associated with a particular word row (i.e. data register 40) of the memory matrix. The SDT row pointer shift register 38 is routed via the ALbus to facilitate modularity. The input PCI and output PCO of the SDT row pointer shift register 38 can be chained together to assemble modular IO configurations.

For the transfer of data in Primary Data Transfer mode the Primary Data Store 16 further includes an 8-bit PDT load data register 42, a PDT load data and mask register 44, a PDT dump data and mask register 46 and a PDT column decoder and selector register 48. The PDT load data register 42 is a shift register which is used in the transfer of data between the APEs 34 and the Primary Data Store 16. The PDT load data and mask register 44 is used to remove unwanted data bits when transferring data from the Primary Data Store 16 to the APEs 34, and the PDT dump data and mask is used to remove unwanted data bits when transferring data from the APEs 34 to the Primary Data Store 16.

Each word row of the PDS memory matrix thus comprises a single 64-bit data register 40, a 1-bit SDT row pointer shift register 38, a 1-bit PDT load data register 42, a PDT load data and mask register 44, a PDT dump data and mask register 46.

Referring now to FIG. 4, the SDMC 20 which is at the heart of the present embodiment is now described in greater detail.

The SDMC 20 comprises a byte rotator 50, a data router 52, a byte aligner 54, a set of sixteen down counter registers 55 and a set of SDMC programmable function registers 56. Data movement between SDS 18 and PDS 16, via the SDMC 20, exploits the ability of the SDMC 20 to reorder byte lanes according to the specific requirements of the transfer. Data parameters 57 in the SDMC function registers 56 each control the delay applied to a block of data to be transferred (described later). Byte lane control is influenced by a dataSize parameter 59 (described later) in the SDMC function registers 56. The SDMC 20 always accesses the SDS 18 on a D64 boundary, but allows D64 items to be passed to and from the SDMC 20 effectively aligned on any byte boundary using a combination of data re-assembly to construct 128-bit words and byte rotation.

Generally, the function of the SDMC 20 is to transfer bytes from the SDS 18 to the PDS 16 in such a way as to facilitate reordering and processing control and efficient processing of the data which contains distortions due to multi-path effects. The key to such processing is to account for the phase delays of each finger (multi-path). The following example of the Secondary Data Transfer (SDT) illustrates this:

EXAMPLE

If each block has 256 physical APEs, then in a transfer of data from the SDS to the

| PDS: | |
|---|---|
| Block b stores: | |
| InputData[Δb + 0] | APE[b,0] |
| InputData[Δb + 1] | APE[b,1] |
| InputData[Δb + 2] | APE[b,2] |
| InputData[Δb + 3] | APE[b,3] |
| . | |
| . | |
| . | |
| InputData[Δb + 255] | APE[b,255] | where Δb is the offset (delay) of the start of input data being transferred from the SDS that is to be captured by block b.

This is implemented in the present embodiment using a known (Aspex-created) SDT into the PDS 16, but with a modification which controls the point at which the PDS 16 in a given block begins to respond. Referring to APPENDIX A and FIGS. 2 and 3, the PDS row pointer 38 is initialised at the head of the block for each block in parallel. However, that block will not be enabled for read/write cycles and the associated row pointer increment, until a programmable block down counter 55 (one of the set of counter registers) indicates that it should do so.

Each block has associated with it such a programmable down counter 55 provided in the SDMC 20, and each counter corresponds to one of the skew offset register 58 of the SDMC function registers 56. Before a SDT starts, each down counter 55 is programmed with the delay value 57 for that block (i.e. Δb1, Δb2 to ΔbN, where N are the number of discrete blocks present in the chip), where the delay value has been taken from the corresponding Skew Offset register 58. The delay values 57 each relate to a single finger and have been determined previously as has been mentioned elsewhere in this specification.

Each down counter 55 is clocked each time a SDT read or write operation is performed. When the down counter 55 reaches zero (or a similarly predefined value), the associated block will be enabled to participate in read or write cycles. The value of the corresponding Skew Offset register 58 does not change during decrementing as it can be used in many different cycles of SDT before requiring to be changed by the programmer of the apparatus.

Note that the multi-write and write sub-sampling features (described later) apply to write cycles only.

Turning now to SDMC data byte rotation and alignment functionality of the SDMC 20, this is illustrated in FIG. 4 where a series of D64 accesses from the SDS 18 is shown (e.g. B17-B10 indicates bytes 7 down to 0, from word 1; B27-B20 indicates bytes 7 down 0 from word 2, and so on). The byte rotator 50 is able to re-orient these words so that, for example, the D64 items have byte 4 as their MS (Most Significant) byte. The byte router 52 is simply used to route the present bytes to the appropriate block for processing and is not described further. Finally, the byte aligner 54 is able to undertake selective byte lane swapping in order to orient specific bytes to specific byte lanes.

Each of the processes of byte aligning and byte rotation are now described in greater detail below. A D64 item, aligned on any byte boundary by the byte rotator 50, is passed from the router 52 to the PDS 16 via the byte aligner 54. First, the byte lane reordering is performed as a function of the selected DataSize parameter in the SDMC function register. This is shown in FIG. 5, where the data size determines how bytes 0 to 7 are aligned.

It can be seen from FIG. 5, that the byte lane alignment is achieved by selectively swapping pairs of byte lane groups. For example, if the data size is D32, then the two possible alignments for D32 transfers can interchange the D32 items within the D64 word.

It is to be appreciated that the byte lane numberings, shown in FIG. 5, are the logical byte lanes after the byte rotation has been performed. They are not the byte lane numbers relative to the D64 memory word boundary.

The SDMC Control and Status Registers 56 are now described in greater detail with reference to FIG. 6, which shows the different configuration registers 56 provided in the SDMC 20. The register set comprises sixteen SkewOffset registers 58 and two Skew Step registers 60. The SkewOffset registers 58 define the base offset address at which the given block will begin to participate in read or write transfers. The use of addresses as the delay values is a convenient way of facilitating the delay without further hardware. This is because the process of transferring data already involves sequentially running through the addresses of the data that is to be transferred. The provision of separate data counters 55, enables the decrementing of the offset values required for the delay not to effect the use of the values for further data capture.

The SkewStep registers 60 have special functionality related to sub-sampling of the data stream coming from the SDS 18 which is described later.

It is to be appreciated that although in this particular embodiment the SkewStep 1 & 2 registers 60 have a global configuration, there is no reason why in an alternative embodiment these could not have a local configuration (i.e. be replicated) for each block. However, the justification and benefit for the added complexity is not readily apparent to the inventor.

The manner in which the SDMC function registers 56 are used to effect block mode transfers is now described.

When the PDS pointer 38 is reset in block mode, a row pointer (not shown) is initialised at the head of each 256-APE block and the skew counter (SkewCount) 55 for each block is loaded with the corresponding previously determined SDMC 'SkewOffset' parameter 57.

The order in which the SDS memory blocks are mapped to the PDS memory blocks is determined by the values 57 loaded into the SkewOffset registers 58. Referring now to FIG. 7, this mechanism allows the transfer of SDS memory blocks to the PDS memory blocks in a multitude of ways including:
1. blocks stored in any order,
2. only a subset of blocks stored (i.e. data replication into the PDS),
3. partially overlapping blocks stored In addition, transfers may be set-up which only move a sub-sampled set of data items, which will be described later.

It is to be appreciated that these different ways of transferring data may be used in combination. This enables a high degree of flexibility in what processing of the stream of incoming data can be carried out efficiently.

Having described the general concept of block mode transfers being effected by programmable control of the SDMC function registers 56, the following describes specific examples of how the different modes of transfer can be effected.

Example 1

Simple Sequential Block Mode Transfer

Figures 8A, 8B:

If a 4K data item sequential transfer from the SDS 18 to the PDS 16 is required, it may be achieved by programming the Skew Offset registers 58 and Skew Step registers 60 as shown in the table illustrated in FIG. 8a. This results in the transfer of data in a simple linear fashion as illustrated in FIG. 8b.

Example 2

Block Reordering Block Mode Transfer

Figures 9A, 9B:
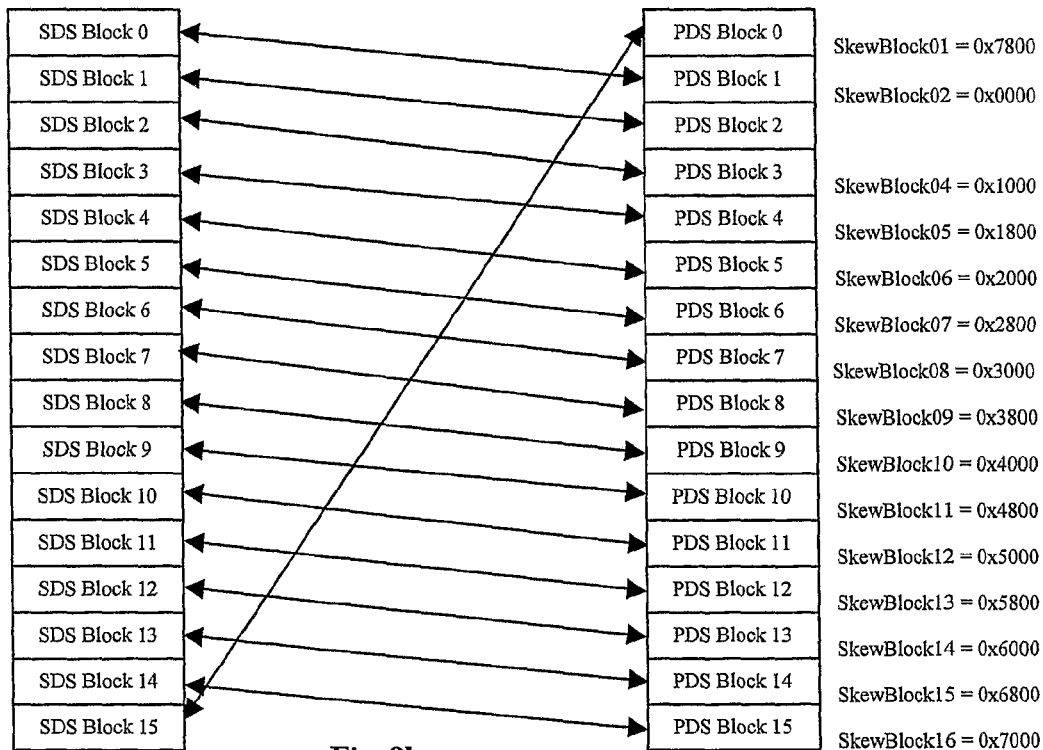

If a 4K data item sequential transfer is required from the SDS 18 to the PDS 16, with the PDS memory block skewed by one block with respect to the SDS memory block, this may be achieved by programming the Skew Offset registers 58 and Skew Step registers 60 as per shown in the table illustrated in FIG. 9a. This results in the transfer of data in a simple linear fashion as illustrated in FIG. 9b.

Example 3

Multi-cast Block Mode Transfer

If a 4K data item overlapped transfer is required from the SDS 18 to the PDS 16, with a subset of the SDS memory data being loaded, it may be achieved by programming the Skew Offset registers 58 and Skew Step registers 60 as per shown in the table illustrated in FIG. 10a. This results in the transfer of a subset of the available data in a simple repetitive broadcast fashion as illustrated in FIG. 10b. The repetition in the counter values 57 is all that is required to replicate the same data for the data transfer. This is another advantage to using counter registers 55 of the present embodiment in the data transfer.

Having described and illustrated how block mode transfers are achieved, block mode sub-sampling is now described. For the sake of clarity sub-sampling techniques are described in the context of a second embodiment. However, it is to be understood that sub-sampling is possible using the first embodiment through mere controlling of the programming of the SDMC function registers 56.

Referring now to FIG. 11, an SDT pathway for a second embodiment is shown. The SDT pathway is identical to that described in the first embodiment except for the provision of a local byte aligner 66 and the byte aligner of the SDMC being called a global byte aligner 56. Furthermore, in the second embodiment, the set of data counters 55 have been shown to be provided at the local byte aligner 66. This is symbolic of the fact that counters relate to data transfer delays associated with specific data blocks.

The operation of the SDMC 20 and the local byte aligner 66 is now described. The support for flexible sub-sampling of the sample stream is achieved via control of the block SkewOffset registers 58 and the SkewStep1 and SkewStep2 registers 60. The SkewOffset settings are the initial values programmed into the SkewCount down counters (SkewOffset Registers 58).

The general rules controlling the transfers for sub-sampling are set out below:
1. When an item is transferred by the SDMC 20 to or from the PDS 16, if the current SkewCount value for a block is less than the size of the data item, the item is written to or read from that block and the PDS row pointer 38 is advanced.
2. Regardless whether an item was written or read, if the current SkewCount value for a block is greater or equal to SkewStep1 60 it is decremented by SkewStep1 60, otherwise it is incremented by SkewStep2.

Use of these rules is highly advantageous in that they mean that sub-sampling can be defined and implemented without the need for subsequent data fetches, thereby reducing the data fetch bottleneck described previously.

In order to initialise a data transfer (sub-sampled or otherwise), the block mode parameter registers must be initialised as shown in the table of FIG. 12.

It is important to remember that the local byte aligner 66 enables data written to PDS locations to be locally byte swapped at each block boundary according to the LSB's (least significant bit) of the current SkewCount value for the block in question. This give a further level of control to the local processing elements which constitute a processing block and enables the programmer to more accurately control the procedure of data processing.

The functionality of the local byte aligner 66 is distinct from that of the global byte aligner 56, which exhibits similar behaviour, but whose operation is global and defined by the dataSize and the LSBs of the SDSaddress of the item being transferred. This organisation is illustrated in FIG. 11.

So for example, if 64 bit items are being transferred, which are D64 aligned, data will be written into the PDS as shown in the table of FIG. 13:

Block mode sub-sampling is now described in detail. The order in which the SDS memory blocks are mapped to the PDS memory blocks is determined by the values loaded into the SkewOffset registers 56. This mechanism allows:
1. the transfer of memory blocks in any order,
2. transfers that involve a subset of SDS memory blocks (i.e. SDS memory block multi-east),
3. transfers that allow irregular block offsets (i.e. partially overlapping blocks), and
4. transfers which move a sub-sampled set of data items.

These mechanisms may be used in combination. However, in considering the behaviour of block sub-sampling, it is worthwhile to consider one block in isolation. For convenience this block will be considered to be an SDS block which is conveniently placed at SkewOffset=0.

Examples

The following examples in FIG. 14 show a range of five different cases of sub-sampling examples (denoted here as CASE 1 to CASE 5). Here, an example 70 of data residing in the SDS memory 18 is shown. Also the values of a set of parameters 72 of the SDMC 20 are also shown. Adjacent each set of parameter values 72, is shown a representation 74 of the resultant PDS memory store, having the resultant data transferred to it. From this it can be seen how the parameters effect the data transfer in a sub-sampling mode.

Referring to a specific case (CASE 2) illustrated in FIG. 14, where DataSize=8 bytes (i.e. D64), and SkewStep1=SkewStep 2=8 bytes.

Remembering the rules:
1. When an item is transferred by the SDMC to or from the PDS, if the current SkewCount value for a block is less than the size of the data item, the item is written to or read from that block and the PDS row pointer is advanced.
2. Regardless whether an item was written or read, if the current SkewCount value for a block is greater or equal to SkewStep1 it is decremented by SkewStep1, otherwise it is incremented by SkewStep 2

These rules are implemented in an algorithm (not shown) which runs on the SDMC 20.

For this specific case (CASE 2) the behaviour of the algorithm is itemised in FIG. 15. It may be seen that application of the rules enumerated above results in every second word being skipped (not written). When a write does occur, then the SkewCount will be zero. Referring to the byte lane swapping protocol in FIG. 13 no byte lane swapping will occur and the data will be written without modification. Consequently, considering the 16 LSBs of the written data word, the following data sequence is obtained P1, P3, P5 etc.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, although the present invention has been described in relation to use with an Aspex SIMD processor, other types of processors could also be used. Also whilst the above embodiments relate to data loading into the PDS, the present embodiments could also be used to read data from the PDS to the SDS. However, it is to be appreciated that some types of data transfer are not possible when reading data out of the PDS. More specifically, any data transfers where the data integrity would be compromised, such trying to create non-overlapping data from overlapping data, do not apply in reverse and so are not valid, Furthermore, whilst one of the primary areas of use of the present invention is in solving the problems of distortion caused by multiple path reflections in the received signal at radio telecommunications base station, other uses of the present invention are clearly possible.

APPENDIX A
Primary Data Store (PDS)

The internal structure of the PDS 16 is shown in FIG. 2 and is described in co-pending International patent application no. PCT/GB2005/000895. Each Associative Processing Element (APE) comprises a 64-bit PDS data register, a 1-bit SDT row pointer shift register, a 1-bit PDT load data register and PDT conditional mask logic.

The Secondary Data interface to the PDS 16 is known as the ASProCore Local bus (ALbus). The shift register 38 is routed via this bus interface to facilitate modularity. The ends of this shift register 38 are simply chained together to assemble modular 10 configurations.

Local Bus (alBus) Interface

Secondary Data Transfers (SDT) transfer data between the PDS 16 and the SDS 18 under the control of the SDMC 20. The PDS SDT row pointer register 38 for a particular APE is used to determine whether the associated PDS data register 40 takes part in a data read or write operation.

Two general methods, outlined below, are provided to initialise the pointer shift register:
1. load the pointer register from a processing element tag register (not shown) under program control, or
2. execute a pointer initialisation cycle on the local data interface.

Normal secondary transfers comprise:
1. a write cycle on the local data interface. The SDT pointer shift-register 38 will post-shift following the data write, or
2. a read cycle on the local data interface. The SDT pointer shift-register 38 will post-shift following the data read.

SDTs take place in D8, D16, D32 or D64 modes, which are defined as:
1. D8 transfers are based upon a secondary transfer word comprising eight bytes packed into a 64-bit word. The transfers will read/write each byte from/to eight separate APEs and the shift register 38 will advance by eight APEs upon completion of the transfer (see FIG. 3(*a*)).
2. D16 transfers are based upon a secondary transfer word comprising four D16 items packed into a 64-bit word. The transfers will read/write each D16 item from/to sfour separate APEs and the shift register 38 will advance by four APEs upon completion of the transfer (see FIG. 3(*b*)).
3. D32 transfers are based upon a secondary transfer word comprising two D32 items packed into a 64-bit word. The transfers will read/write each D32 item from/to two separate APEs and the shift register 38 will advance by two APEs upon completion of the transfer (see FIG. 3(*c*)).
4. D64 transfers are based upon a secondary transfer word comprising a single D64 item. The transfers will read/write each D64 item from/to the selected APE and the shift register 38 will advance upon completion of the transfer (see FIG. 3(*d*)). It is to be appreciated that these packing modes may be selected independently of the size/alignment of the item defined at the ALbus interface.

The schematic illustrations of FIGS. 3*a* to 3*b* show the effect of a single secondary transfer. The labelled fields of the selected memory words are transferred to/from the secondary interface in a single clock cycle.

The invention claimed is:

1. A data movement controller for controlling the movement of data between a shared data store and a local data store such that the data can be used by a set of parallel data processing elements associated with the local data store, the data movement controller comprising a set of data registers which, in use, are loaded with different data parameters to define a plurality of different types of data transfer between the shared data store and a set of processing elements associated with the local data store; the data parameters defining a set of time delays for transferring portions of the data to predefined areas of the local data store for use with the set of parallel data processing elements and defining the types of data transfer that are to be carried out, wherein at least some of the data parameters are a plurality of skew offset parameters that are calculated by determining a plurality of phase delay times relating to multiple transmission paths between a source and a base station and calculating the plurality of skew offset parameters from the corresponding phase delay times, the values of the plurality of skew offset parameters specifying the manner in which data is to be transferred between the shared data store and the local data store, including the timing of each transfer, wherein the controller is arranged to implement a sub-sampled block mode transfer.

2. A controller according to claim 1, wherein the set of data registers are programmable, and each can be loaded with an offset value for specifying an individual time delay in effecting a data transfer between the shared data store and the local data store.

3. A controller according to claim 2, further comprising a plurality of data counters which, in use, are loaded with the offset values programmed into the registers and subsequently decremented to a predetermined value to effect corresponding delays.

4. A controller according to claim 2, wherein the plurality of data registers further comprise a first step register for storing a first step value, the first step value defining the size of a decrementing step to be applied to the offset values stored in the data registers.

5. A controller according to claim 4, wherein the first step value is determined by the size of the data of the sample retrieved from the shared data store.

6. A controller according to claim 4, wherein the set of data registers further comprise a second step register for storing a second step value, the second step value assisting in determining the manner in which the data transfer is to be effected.

7. A controller according to claim 6, wherein the second step value comprises a difference between successive offset values minus the first step value.

8. A controller according to claim 1, further comprising means for execution an algorithm for determining the type of overall data transfer that is to be carried out.

9. A controller according to claim 6, further comprising means for executing an algorithm for determining the type of overall data transfer that is to be carried out.

10. A controller according to claim 9, wherein the type of overall data transfer to be carried out is defined by the offset values and the first and second step values.

11. A controller according to claim 1, wherein the controller is arranged to implement a plurality of types of data transfer selected from the group comprising: a simple sequential block mode transfer, a block reordering block mode transfer, a multi-cast block mode transfer and an overlapping block mode transfer.

12. A controller according to claim 5 wherein the controller is arranged to implement a sub-sampled block mode transfer.

13. A controller according to claim 12, wherein the second step value determines the manner in which data sub-sampling is to be carried out without executing a further data fetch instruction.

14. A controller according to claim 1, wherein the plurality of data registers comprise a data size register for specifying a size of the data sample to be handled as a indivisible unit in the data transfer.

15. A controller according to claim 1, further comprising a data byte aligner arranged to align bytes to be transferred into byte lanes and then to swap bytes between byte lines to change their sequential ordering.

16. A controller according to claim 14, further comprising a data byte aligner arranged to align bytes to be transferred into byte lanes and then to swap bytes between byte lines to change their sequential ordering.

17. A controller according to claim 15, wherein the data byte aligner is arranged to align the data bytes on any specified byte boundary.

18. A controller according to claim 16, wherein the data byte aligner is arranged to align the bytes of data to be transferred according to the sample size specified in the data size registers.

19. A controller according to claim 18, wherein the data byte aligner is arranged to align the bytes of data to be transferred according to the least significant bits of an address of the data sample being transferred 20. A controller according to claim 15, wherein the byte aligner comprises a global byte aligner arranged to align bytes according to global parameters relating to the data transfer and the shared data store.

21. A controller according to claim 20, wherein the byte aligner comprises a local byte aligner arranged to align bytes according to local parameters relating to the local data store.

22. A controller according to claim 1, further comprising a byte rotator for rotating the sequence of data bytes to be transferred to the local data store, the byte rotator being arranged to rotate the data bytes to any data byte boundary specified.

23. A controller according to claim 11, wherein the controller is arranged to implement a combination of types of data transfer.

24. A controller according to claim 1, wherein the set of data registers are programmable, and each can be loaded with an offset value for specifying an individual time delay in effecting a data transfer between the shared data store and the local data store, the controller further comprising:
  a plurality of data counters which, in use, are loaded with the offset values programmed into the registers and subsequently decremented to a predetermined value to effect corresponding delays; and
  a data byte aligner arranged to align bytes to be transferred into byte lanes and then to swap bytes between byte lines to change their sequential ordering
  wherein the byte aligner comprises a global byte aligner arranged to align bytes according to global parameters relating to the data transfer and the shared data store and a local byte aligner arranged to align bytes according to local parameters relating to the local data store
  wherein the plurality of data counters are provided at the local byte aligner.

25. A controller according to claim 1, wherein the controller is provided on an apparatus, the apparatus further comprising the shared data store and the local data store.

* * * * *

UNITED STATES PATENT AND TRADEMARK OFFICE
CERTIFICATE OF CORRECTION

| | | |
|---|---|---|
| PATENT NO. | : 8,929,829 B2 | Page 1 of 1 |
| APPLICATION NO. | : 11/629293 | |
| DATED | : January 6, 2015 | |
| INVENTOR(S) | : Whitaker | |

It is certified that error appears in the above-identified patent and that said Letters Patent is hereby corrected as shown below:

In the Specification

In Column 4, Line 58, delete "with in" and insert -- within --, therefor.

In Column 5, Line 40, delete "an hierarchical" and insert -- a hierarchical --, therefor.

In Column 10, Line 54, delete "multi-east)," and insert -- multi-cast), --, therefor.

In Column 11, Line 67, delete "10 configurations." and insert -- IO configurations. --, therefor.

In Column 12, Line 27, delete "sfour" and insert -- four --, therefor.

In the Claims

In Column 13, Line 52, in Claim 14, delete "a indivisible" and insert -- an indivisible --, therefor.

In Column 14, Line 16, in Claim 19, delete "transferred" and insert -- transferred. --, therefor.

In Column 14, Line 44, in Claim 24, delete "ordering" and insert -- ordering; --, therefor.

In Column 14, Line 48, in Claim 24, delete "data store" and insert -- data store; and --, therefor.

Signed and Sealed this
Twenty-eighth Day of July, 2015

Michelle K. Lee
*Director of the United States Patent and Trademark Office*